United States Patent [19]

Dethloff et al.

[11] Patent Number: 4,968,873
[45] Date of Patent: Nov. 6, 1990

[54] SMART CARD ISSUING AND RECEIVING APPARATUS

[75] Inventors: Juergen Dethloff, Brandstucken 35, 2000 Hamburg 53; Christian Hinneberg, Hamburg, both of Fed. Rep. of Germany

[73] Assignee: Juergen Dethloff, Hamburg, Fed. Rep. of Germany

[21] Appl. No.: 316,233

[22] Filed: Feb. 27, 1989

Related U.S. Application Data

[63] Continuation of Ser. No. 94,379, Sep. 8, 1987, Pat. No. 4,837,422.

[51] Int. Cl.⁵ .................. G06F 15/21; G06K 19/07
[52] U.S. Cl. ............................. 235/380; 235/379; 235/375; 235/492; 902/26; 902/11
[58] Field of Search ............ 235/375, 379, 380, 381, 235/487, 492, 384; 340/825.33, 825.35; 902/11, 13, 20, 21, 25, 26; 364/401, 408, 409

[56] References Cited

U.S. PATENT DOCUMENTS

| | | | |
|---|---|---|---|
| 3,501,622 | 3/1970 | Weir et al. | 235/384 |
| 3,984,660 | 10/1976 | Oka et al. | 235/381 |
| 4,251,867 | 2/1981 | Uchida et al. | 902/20 |
| 4,614,861 | 9/1986 | Pavlov et al. | 235/380 |
| 4,620,727 | 11/1986 | Stockburger et al. | 235/380 |
| 4,766,293 | 8/1988 | Boston | 235/492 |

FOREIGN PATENT DOCUMENTS 1945777 12/1979 Fed. Rep. of Germany .
8303018 9/1983 World Int. Prop. O. .

*Primary Examiner*—Stuart S. Levy
*Assistant Examiner*—Robert Weinhardt
*Attorney, Agent, or Firm*—Notaro & Michalos

[57] ABSTRACT

An apparatus for issuing a transaction card comprises a value receiving mechanism in the form of a card reader or a bank note acceptor or both. The apparatus includes a memory for storing the exchange rate for a plurality of currencies as compared to a local visitor's voucher which can be issued by the apparatus. A mechanism is also provided for storing a maximum transaction limit corresponding to a selected number of visitor's vouchers, which in turn corresponds to value of currency received. The transaction card is advantageously a smart card or chip card, which carries a program mechanism and central processing unit for manipulating the values which can be stored in the card.

9 Claims, 16 Drawing Sheets

CANCELLATION OF SUB-USER AUTHORIZATION          FIG. 10

VARIABLE VALUE RE-CHANGE ("VV" KEY)
(EXAMPLE "FOREIGN EXCHANGE")

CARD OPERATION

SMART CARD ISSUING AND RECEIVING APPARATUS

CROSS-REFERENCE TO RELATED APPLICATIONS

This application is a continuation of application Ser. No. 094,379, filed Sept. 8, 1987 and granted as U.S. Pat. No. 4,837,422 on June 6, 1989.

FIELD AND BACKGROUND OF THE INVENTION

The present invention relates, in general, to electronic transaction and identification systems, and, in particular, to portable electronic transaction devices, such as cards, keys, etc. and appertaining stationary equipment, such as terminals and coding and transaction devices.

For the sake of simplicity, the portable devices will be referred to as "cards" "M-cards" or "modules". M-cards, for the purpose of this application, are plastic devices, comprising integrated circuits, commonly called "smart cards" or "chip cards". Such smart cards or chip cards contain electronic components in microstructure, i.e. integrated circuits. Devices of this nature have been disclosed in German patent DE 19 45 777 C3 to DETHLOFF, filed on Sept. 10, 1969.

The integrated (semiconductor) circuits contained in such cards are generally of two types: logic structures and memories.

Before the advent of these cards, all machine-operable or machine readable cards carried only passive memory means. Information could be written on or read from a magnetic stripe, for instance. A piece of information could also be erased from the stripe and another, e.g. updated, piece of information, could be written onto it again. The capacity of magnetic media on cards is limited to a few hundred bits of information.

The advantage of a card containing chips is twofold: the logical structures make the card active, i.e. information can be processed within the card and could be computed or compared with other information and the like. The other advantage is provided by the semiconductor memories, which have a multifold capacity compared with magnetic media on cards, and which can be programmed in various ways (to make their contents inaccessible after write-in, to make it unalterable etc). It can be foreseen, that within a reasonable period of time, chip cards will be more generally introduced and will replace the presently widely used magnetic stripe cards. Presently, common cards, magnetic stripe, and others, are "single-user cards", i.e. such cards are assigned to only one cardholder.

Current magnetic stripe cards, which are machine-operable, carry as one piece of information on their magnetic stripe, a personal designation of the rightful cardholder. A so-called PIN (Personal Identification Number) is widely used as such a personal designation. It is encrypted and, when the card is used, it will be decrypted in the reading device. To ensure the identity of the user and the rightful owner, the PIN is read from the mag stripe and then decrypted. The PIN is then compared in the reader, with the PIN inputted into the reader by the user.

The algorithm to decrypt the coded PIN obtained from the card is available in all readers. It is obvious that technically trained criminals could obtain the algorithm or the decrypting module or a whole reader, to illegally decrypt PINs from stolen cards or to learn how to encrypt false PINs onto the memory of forfeited cards.

To overcome this drawback, U.S. Pat. No. 4,105,156, to DETHLOFF, discloses memory means that are inaccessibly and integrally incorporated in a card for entry and storage of information therein, and further, the contents of the memory being available only within the card.

This patent further discloses components included in the card and activated in response to inputs from a reader, to effect checking of the identity and entitlement of a user of the card. Thus, the comparing of the PIN stored in the card and the PIN inputted at the time of using the card is no longer executed in the reader. No algorithm can be derived or stolen from the reader, nor does it make sense to obtain a reader for deriving PINs from stolen cards or illegally encrypting PINs for faked cards.

But still the PIN is to be inputted into the card for checking via the reader by keying the PIN onto the PIN keypad of the reader. It is possible to illicitly tap the line from the PIN keypad in the reader to the terminals of the card. This would permit a criminal to learn individual PINs from specific cards.

To eliminate this kind of a risk, U.S. Pat. No. 3,641,316, to DETHLOFF et al, discloses means incorporated in a card to input the PIN directly into the card. This, in addition, eliminates the possibility of a third person unauthorizedly spying out the PIN, when same is keyed in onto the keypad of the reader by the rightful cardholder.

Upon checking (comparing the PINs), the checking means within the card produces a signal, which indicates whether the inputted PIN corresponds to the stored PIN or not.

It will be understood that cards can be faked to produce positive signals. It is therefore essential that a precedent card authentication check is made. Only an authentic, i.e., genuine card can produce a true identity check signal.

Such checks for authentication will very probably be based on so-called public key or "trapdoor" algorithms, as disclosed in U.S. Pat. No. 4,405,829 to RIVEST et al. This kind of verification requires a secret key to be "sealed" within the card, i.e., the key is to be charged into a memory within the card in a way that it cannot be read out from the card and cannot be altered after having been charged and that it is only available within the card for processing when executing an authentication check.

A key in the form of a card with a magnetic stripe that can be programmed by the issuer when issued for a selected period of time to unlock doors, for example, in a hotel, is known from U.S. Pat. No. 4,385,231 to MIZUTANI et al. U.S. Pat. No. 4,523,297 to UGON et al discloses a portable hand held machine which includes a keyboard, display, microprocessor and memory, and which receives a carrier in the form of a plastic card, which also carries a microprocessor and memory for the purpose of carrying on a dialogue between the machine and the carrier. Also, see U.S. Pat. No. 4,305,059 to BENTON which discloses a system for transferring funds utilizing portable modules carrying keyboards and displays; U.S. Pat. No. 4,614,861 to PAVLOV et al which discloses a unitary self contained card having keyboard and display; U.S. Pat. No.

3,996,450 to KERKHOFF disclosing a cash dispenser with a PIN changing function; and U.S. Pat. No. 4,460,965 to TREHN disclosing the loading of a sub transaction memory from a main credit memory in portable devices.

DETHLOFF U.S. Pat. No. 4,105,156 claims memories that are chargeable only once and the contents of same being only available within the card.

As will be seen thereafter, the integrated circuits within a card, which include memories whose contents are only available within the card, components included in a card, which are responsive to an input from outside the card, and means incorporated in a card to input information directly into a card, represent the state of the art.

It is further within the state of the art that cards are issued and assigned to one and one only user or cardholder. It is common practice for card issuing organizations to strictly instruct card users not to give away or permit other persons to use the card. The organizations hold the cardholder liable for any seemingly authorized use of the card by third persons.

For example: the instructions of a known card issuing organization, which will be called XY, read as follows:

"keep your XY card in a safe place and permit no other person to use it....do not tell any other person your secret Personal Identification Number (PIN) or write your number on your XY card or otherwise make it available to anyone".

The XY cardholder Agreement states:

"We will mail you a secret PIN and you agree to keep the number secret, even from bank employees".

The limitation by the principle "one card—one user" represents an uncomfortable inconvenience. If one thinks, for example, of a card used by travelers abroad. The cardholder is accompanied by his or her family; the cardholder is required, in each and every case, to execute card transactions personally, i.e. he/she could not send somebody else of the family for shopping with his/her card.

Aside from traveling, there are numerous examples when cardholders are hindered by having to appear personally to use their cards. They often would like to charge somebody else to do the transaction or to obtain the service in question for him/her. However, cardholders are not permitted to hand over their cards and name their PIN to third parties. In most cases, they would not want to do this either. So card issuing organizations and cardholders find themselves on the same side. If third persons were permitted to use the cards and, therefore, to learn the PIN of the original cardholder, they could dispose of the whole value which is assigned to the card.

In an attempt to overcome this inconvenience, card issuing organizations sometimes offer additional cards for cardholders' families ("partner cards") or members of cardholders' business, often at lower cost.

The card issuing organization may thus assign one card to more than one person and personalize such card with more than one PIN, each one for a different person. This, however, would require an advance determination of the use data (money, services, time frames or other authorization) for each authorized person. Such procedure would only meet the requirements of a small percentage of conceivable applications or cardholders. It would also require quite some amount of red tape to be exchanged between the card issuing organization and such applicant cardholders to prepare and agree upon the individual card (use) data for the personalization of those cards in a legally satisfying way and to cover the relevant liabilities.

All in all such preprogrammed cards for plural users would be an inflexible instrument as day-to-day requirements of users cannot be foreseen.

The multi-user card (M-card) of the present invention should not be mistaken for a multi-purpose or multi-service card, i.e., a card which is commissioned or backed by different "issuers", that is to say by different businesses, for example, by one or more banks, a railway company, a gasoline company and by a car parking business. Cards of this nature have been disclosed, for example, in U.S. Pat. No. 4,443,027, by McNEELY et al as a Multiple Company Credit Card System. Also, see U.S. Pat. No. 4,656,342, to UGON. Such cards are still assigned to only one cardholder.

U.S. Pat. No. 4,277,837 to STUCKERT discloses a portable terminal for receiving two cards for conducting transactions between the cards. PCT application no. WO83/03018 discloses the use in cards of a plurality of identifying characteristics which can be randomally selected.

The limitation of one card to one cardholder is not the only drawback of present card systems. Another one is represented by the inflexibility of the values of stored units of money or other credits.

Cards contain in their memories, information which permits the cardholder to obtain certain values, i.e., a piece of merchandise, a service such as car parking, or a fare from location A to location B. Such credit information is usually expressed by "units". Those units may represent different values, even in the same card In a multi-purpose or multi-company card system, one card may contain different kinds of units for different kinds of businesses, such as a bank, a railway company, a gasoline company or a parking lot. For example, the "units" in banking are designated as money units (1 unit—1 U.S. $ or 1 yuean), the "units" of a railway company can be designated as a number of rides between two predetermined locations for commuting The "units" of a gasoline company are—again designated as money units, and a unit of the car parking can be equivalent to one day's parking.

All cards to date have in common that such units do not change their individual value from the time of card issuance or re-issuance until the moment when the last unit is "consumated". In other words one unit "initiated" as one U.S. Dollar or as a one way fare from location A to location B, retain, for the time of their "life", the value of one U.S. Dollar and of such one way fare.

Presently known cards, thus, (a) are single-user cards (unless they would originally be personalized by the issuer for more than one user, which, however, has practically not yet been done) and (b) contain "units" whose value is unalterable once loaded.

Summarizing, it can be stated that the relevant assignments, such as (a) the assignment of a card to a user (cardholder), (b) the assignment of a designation to the credit units, and (c) the assignment of a value to one unit, are (A) controlled by the issuer(s) and (B) accomplished prior to issuance or reissuance of the card.

SUMMARY OF THE INVENTION

It is one object of the present invention, therefore, to provide a system wherein a card issued to a single cardholder or user, comprise means controllable by the cardholder at any time after issuance or reissuance, to assign rights to third parties, to change and cancel such rights and to assign additional designations and values to data stored in the card. The cardholder and the sub-user can also change designations and values of data originally assigned to such data by the issuer(s), all within the scope of the original rights, terms and conditions of the issuer(s). Expressed more generally, the inventive system with cards or other modules, includes means for permanent after issuance or after reissuance variability of data stored in memories within the card, by assigning codes, values and designations to said data stored in said memories within the card In more detail, these means are controllable by the cardholder to assign rights to a third person (sub-user) at any time, at any place and to any selectable extent of use of the card, within the scope or rights, terms and conditions the card has originally been initialized or reissued for by the issuer or the issuers, to the cardholder. The card is assignable by the cardholder to a predeterminable number of sub-users. The extent of rights, terms and conditions for sub-use by an individual sub-user, can refer (a) to its application or issuer, such as for banking involving monetary application, or railway riding involving a service; (b) to the term within which the assignment shall be valid; and (c) to the value, e.g. in money units, service units, number of uses or any other kind of digitally determinable credit or authorization, and to other properties of the card.

These means further allow the cardholder or the issuer, after issuance or re-issuance of the card, to assign different values to one unit, change the designations of units and assign additional designation to a unit, all within the scope of the original extent of terms, and credit values initialized or reissued by the issuer(s).

The capabilities of the card, namely to be assignable to sub-users and to be alterable as to the values and designations of the stored units, can be provided in individual (single) or in combinational (multi-user card-+variable value card) embodiments.

It is another object of the present invention to provide a card with one or both of the aforesaid properties which is compatible with existing systems. The input and output procedures of the multi-user card can be made to match the standards for cards that are within the state of the art.

The cardholder's operation to assign certain rights of use to sub-users is selfcontained. That is, it does not require any assistance from the system. The system can be designed, however, to provide assistance to the cardholder to do the programming any time after issuance or reissuance, at the cardholder's option, and in accordance with his or her then prevailing requirements.

It is still another object of the invention to provide key means for entering data into the card, display means for checking the available conditions and balances of consumable values, units and time and for specifying and checking the assignment or alteration data, and a resident power source. The card further includes memory means and logic control means to process data when (a) the card is assigned to a sub-user, (b) values are altered or newly designated and (c) the card is used by a sub-user with the original unit values and designations or by the cardholder or a sub-user with altered unit values and designations.

It is still another object of the invention to provide such a card without keyboard, display and power source, but in combination with a supplementary device ("envelope") that can be connected to the card, the supplementary device comprising the keyboard, display, logic and memory means, and a power source. The exterior of the card is then indistinguishable from conventional cards.

The supplementary device can be portable or stationary. The contact between card and supplementary device can be galvanic or otherwise, such as optical, inductive, capacitive or by microwave. The supplementary device includes the means to assign the card to sub-users and to assign and alter values and designations. The supplementary device can be made in at least two embodiments, one for assigning the card to sub-users, and another one to assign and alter values and designations, or it can be embodied as a combination device for both tasks. This card is hereafter referred to as an "M-card", while the supplementary device is referred to as an "M-card envelope" or simply an "envelope".

It has been found that a substantial need in the business and banking community would be satisfied by the provision of a cardholder controllable multi-user card, such as that of the present invention. This card would serve to greatly enhance the comfort and convenience of cardholders, card issuing organizations and card receiving businesses. Cardholders would be relieved of performing each and every transaction themselves and would be allowed to designate third persons as sub-users to do one or more particular transaction or to obtain certain services within the limitations of fixed terms and conditions set by the cardholder without disclosing his/her PIN and without opening thereby the card's full credit to such sub-users. For assignment to a sub-user a new PIN has to be entered for that sub-user. The M-card of the present invention can thus also serve to enhance security against loss and theft. In cases when a cardholder is afraid that during the course of a transaction the PIN could be explored or spied out by a third person, he could make the M-card useless for a thief or a dishonest finder. The cardholder simply preprograms the M-card to make himself a sub-user, i.e., to assign (besides his main PIN) a new PIN and limits the available value under the new PIN to the approximate or exact amount of the expected transaction and also sets a time window (term) within which such transaction shall be possible. He can do this shortly before a transaction is executed. Should he lose the card thereafter, the preprogrammed credit has either been consummated or the time limit has expired.

Another advantage is the alterability of values and designations. This makes the M-card flexible in a way which cannot be foreseen as to all possible aspects. The following examples may serve to understand a few of the new applications.

While it is conceivable that cards within the state of the art could be initialized by the issuer for different currencies, this is not very comfortable though, as most people cannot foresee what their needs will be in a year's time or so. It would enhance convenience and comfort, if without re-initializing (reissuing) the card, either a bank or the cardholder, or even a sub-user, could "change" any time, currencies within the M-card to the extent which is set by either the originally initialized terms and conditions and values or by the relevant sub-user data. In another application, where a business ("company") is the cardholder, the M-card can become a so-called company card. They may be in the form of credit cards. Such company cards can be given by the company to employees who travel at the company's expense. The company can assign the M-card to an employee to make him/her a sub-user of the M-card and set the estimated amount of credit in one or more currencies with a time limit. When using the M-card the employee enters the kind of expenditure into the card and then the M-card automatically keeps records of the transactions. When traveling abroad, he/she could even change valuta from one currency to another when he/she needs money in another country. The procedure of changing valuta with floating rates of exchange will be described later. Upon return of the employee, he/she surrenders the M-card to the issuing company office. The issuing company office then inserts the M-card into a reader, where the transactions are read out from the transaction memory, the transactions representing the expense account of the traveling employee and are fed into the computer accounting system, where it is further processed. Thereafter, the transaction account in the memory of the M-card is reset to zero, the sub-user PIN (M-PIN) memory is cleared and the M-card can be programmed to be issued to another traveling employee.

It can easily be seen that the advantages of an application like this are manifold: the company saves liquidity. Since it need not furnish the traveling employee with cash money, (or its equivalent in travelers checks), and it saves card fees, since it need not obtain individual cards for all or most of its traveling employees. Further, the employee is relieved of having to sit down and write expense accounts. The bookkeeping of travel accounts is automated. The procedure even prevents "padding" or falsification of travel expense accounts or other expense accounts, since the transaction memory of the M-card reflects the true value of each transaction, unless a vendor cooperates fraudulently with the employee.

Another application becomes evident when an M-card is used by a traveling family. In such case, the cardholder can assign the M-card in different ways, e.g. to certain members of the family for the whole time of the trip and to others, only from one expected transaction to another or for a day or a number of days. The cardholder can program full authority for instance, for his or her spouse and limited amounts for the children. In addition, the M-card can serve as a foreign valuta means of payment, as described before.

For changing valuta from one currency to another, which means altering the value of units and altering the designation of units, i.e., to "change" a certain amount of currency A to currency B, where there is a floating rate of exchange, a device or a machine serves to calculate and to authorize such "exchange" to make the M-card operable for transactions in the "new" currency. Such devices or machines will be installed by internationally operating card issuing organizations at locations where travelers mainly convene, e.g. airports, railway stations, hotels, etc. The machines operate on-line with a host computer, which updates the prevailing rates of exchange of floating currencies, permanently or from time to time.

In still another application where a country provides visitors from abroad with special goods and services to be obtained at special places, e.g., hotels, M-cards provide advantages over a system which either furnishes the visitor with special visitor vouchers (ViVo) in exchange for his/her foreign valuta, or which country requires payment at those special places by foreign valuta. Neither alternative may suffice when it is illegal for domestic people to possess either visitor vouchers or foreign currency, especially when visitors pay for goods and services with ViVos or foreign currency at such places which also accept domestic currency.

Now, in a system of the present invention which permits or requires the foreign visitor to exchange his/her foreign valuta against a "Visitor's Voucher Card", M-cards can be issued at the consulates of the country or at the place of entry into the country from M-card issuing machines into which the visitor's name, the PIN selected by him/her and the amount of money he/she wants to exchange is entered. Such machines can also comprise a banknote receiving module for valuta of a known type or a card acceptor for visitors' home credit or debit cards. The machine may even store the visa and health certificate of the visitor or visitors in their M-cards. When traveling inside the country, the visitor can assign the card to his/her co-traveling family members in accordance with their requirements.

The great versatility of M-cards can be demonstrated by still another example within the aforesaid application of the M-card as a visitor's voucher card. The visitor may wish to obtain goods or services which are provided at certain places for domestic people and foreign visitors alike, such as clothes in department stores or airline or railway tickets. Since the visitor, when entering the country and exchanging his/her money, cannot predetermine or foresee what will be the ratio of special goods and services reserved for foreign visitors to be paid by ViVos or the like, on the one hand, and other goods and services being obtainable by domestic customers and foreign visitors as well as to be paid by domestic money on the other hand, he/she—at the moment of transaction—enters into the M-card, the amount of money in domestic currency he/she is due to pay, which then is "exchanged" within the M-card into domestic currency. Thus, the domestic vendor receives domestic currency from domestic and foreign customers likewise In cases like this, there is no need for a device or machine to calculate and validate card currency exchanged, as the government authorities use to set a fixed rate of exchange between visitor's vouchers (ViVo) and domestic currency, i.e., at least during the term of the M-card there is no floating rate, of exchange.

Further, at places such as hotels, airports and railway stations, where visitors accumulate, domestic currency cash dispensers can be placed which accept M-cards with an already pre-changed credit in domestic currency to provide the visitor with domestic bank notes.

While specific embodiments of the invention have been shown and described in detail to illustrate the application of the principals of the invention, it will be understood that the invention may be embodied otherwise without departing from such principals.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 1:
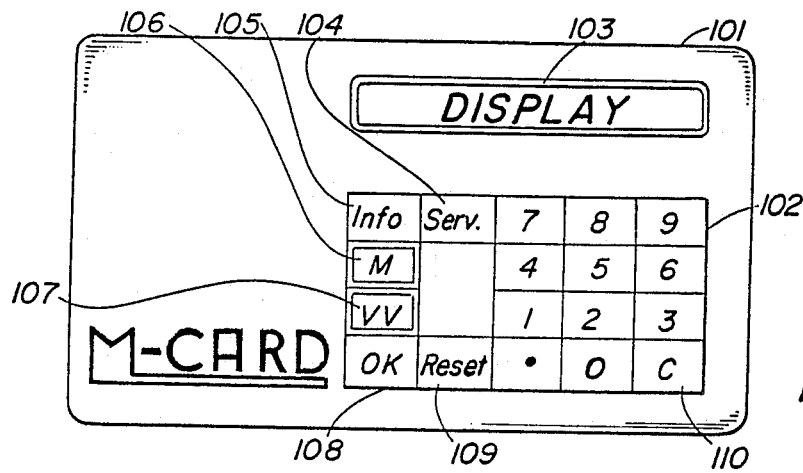
FIG. 1 is a plan view of the M-card, used with the system of the invention, in its self-contained form.

The objects of the present invention are accomplished in general, by a device which may be portable or not, and operative in conjunction with other devices. In case the device is portable, it is hereafter referred to as our "M-card". In another embodiment, which may be portable or stationary as well, it is referred to as "incentive module" or "IncMod". While the M-card is compatible with cards in external systems which conform with generally accepted standards, the other embodiment of the module, forms, in combination with appertaining devices, a system of its own. Such other devices would normally be in the form of a terminal or an off-line stand alone unit, which will be referred to as a "business station" or "BST".

The M-card includes keyboard means for entering commands and identification data, and numerical values comprising, but not limited to, transaction data. The devices further include memory means for permanently and temporarily storing data, and logic means for performing logic processes and arithmetic calculations on data stored in the memory means and data entered via the keyboard means. Display means are provided for selectively displaying data including, but not limited to the commands and transactions to the card and to the module in its portable embodiment. The devices include also a power source, such as a battery.

The M-card may comprise all means as described above. In an alternative embodiment, the above means are distributed between the card and an "envelope", hereafter referred to as "M-card envelope".

In such an embodiment, the M-card comprises logic and memory means, while M-card envelope may include other logic and memory means, display means, keyboard means and an internal power source.

The M-card envelope in its portable form, in general, has the form of a card, whereby its outer dimensions are a small percentage greater, so that it can receive the M-card through an opening at its shorter side.

This embodiment of a combination consisting of M-card and M-card envelope has the advantage that the M-card looks like conventional cards and does not include display or keyboard means and the power source.

Since the function of the M-card, when it also comprises the display and the keyboard means and power source, is analogue, i.e., almost equal to the function of a combination consisting of an M-card and an M-card envelope, only the latter one will be described in more detail.

The present M-card envelope would normally, although not necessarily, be owned by the holder of an M-card. However, the M-card and the M-card envelope are not logically connected with each other. So, an M-card holder could use any other "foreign" M-card envelope to program his/her M-card.

The M-card, when used for transactions in an external system, is utilized as any standard smart card or chip card, i.e., the utilization of the M-card for transactions does not require the presence of the M-card envelope.

For programming the M-card, the M-card is placed inside the M-card envelope. The M-card envelope may serve as a container for the M-card, when it is carried around by its holder. When the M-card envelope serves as a container, the M-card is totally inserted into the M-card envelope.

To prepare the combination of M-card and M-card envelope for programming the M-card, the M-card and the M-card envelope must be configured in a way that a cooperative data exchange relationship is established. This can be done via galvanic contacts or otherwise, such as inductance, light, microwave, etc. In the present description, galvanic contacts are assumed.

Referring now to FIG an M-card 101 is shown in its selfcontained form. The keypad 102 includes the numerical keys "1" through "0" and "C" 110, which serves to cancel the last entry, and further "reset" 109, "ok" 108, "info" 105, "service" !04 and the special keys in accordance with the present invention; "M" 106 and "VV" 107. The M-card 101 further includes the alphanumerical display 103.

Figure 2:
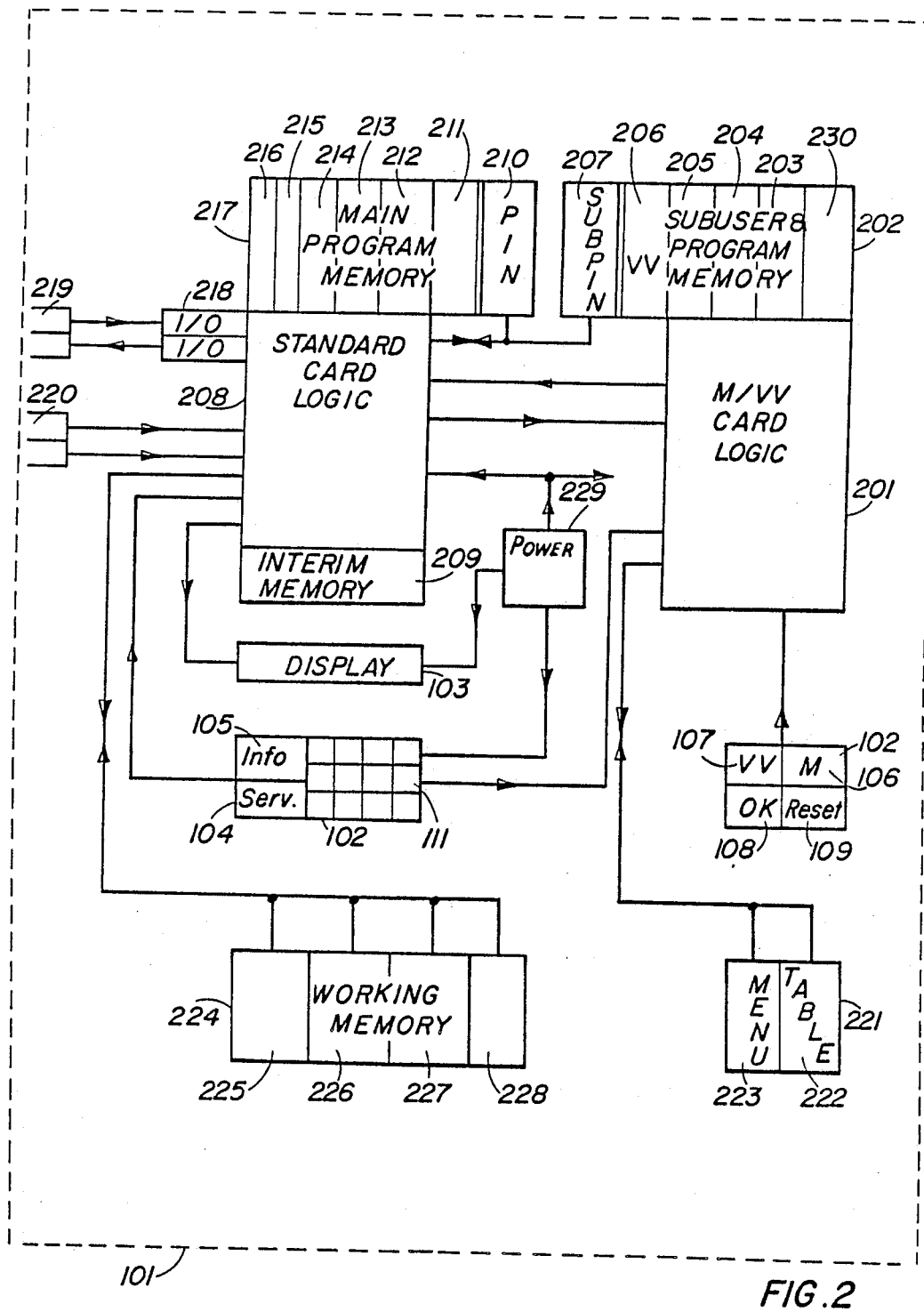
FIG. 2 is a block diagram of the components of the M-card shown in FIG. 1.

FIG. 2 is a block diagram, where the terminals 219 and 220 establish contact with an external device. The terminals 219 are connected to an input/output device 218, which establishes a serial data exchange with an external device. The terminals 220 connect to a power supply from an external source. A standard card logic 208 serves mainly to authenticate the card, the PIN (checking the identity of the user and the rightful holder of the card) and for external transactions. An interim or temporary memory 209 accepts external data for the time of the checking procedure, when such external data, the PIN and other identifying data, are fed into this memory to be internally checked as to whether they are correct or not. A program memory 217 comprises an into-program 216, a multi-service program 215, an external transaction program 214, an arithmetic calculation program 213 and PIN check program 211. A cardholder's PIN memory 210 is not accessible from outside and its content is only available within the card. Interim memory 212 stores data for further internal processing. A multi-user (M) and variable value (VV) logic 201 is logically adjacent to sub-user PIN program memory 206, variable value program memory 205, internal transaction program memory 204 and display or text program in memory 230. A sub-user PIN memory 207 is not accessible from outside and its content is also only available within the card. Sub-user PINs can be stored and erased under the control of M and VV logic 201. A working memory 224 comprises transaction accounts for the cardholder and sub-users 225, the terms of use for the cardholder and for sub-users 226, the VV transaction account for cardholder and sub-users 227 and the table of different services the card is commissioned for 228. The above working memory 224 is part of the standard function package of the card. A working memory 221 comprises a conversion (variation) factors table 222 and a designation menu 223. Memories 223 and 222 can be arranged as a combinational register, where at least one designation is assigned, or correlated with one variation factor.

It is noted that while the PIN is given as an example of cardholder and sub-user enabling code, any other code can be used, such as a voice print (to be stored as data and input by the cardholder or sub-user) or an algorithm such as a "trapdoor" algorithm mentioned above.

Except for the terminals or connectors 219 and 220, the foregoing parts may all be integrated into one monolithic circuit. The keyboard 102 comprises its numerical keypad 111, the function keys "service" 104, "info" 105, "reset" 109, "ok" 108 and the following keys, which are part of the present invention; the sub-user programming key "M" 106 and the variable value key "VV" 107. The display 103 provides information concerning the user, and guides the cardholder when using the ("M") function "sub-user programming", as well as to guide the cardholder and a sub-user when using the function "variable value". A power source 229 provides internal electric power for the logic circuits when in operation, and for programming and erasing EEPROM type of memories for sub-user PIN programming and variable value storage. Its function will be explained in more detail later in connection with, FIG. 8, whose function and operation are identical.

Figure 3:
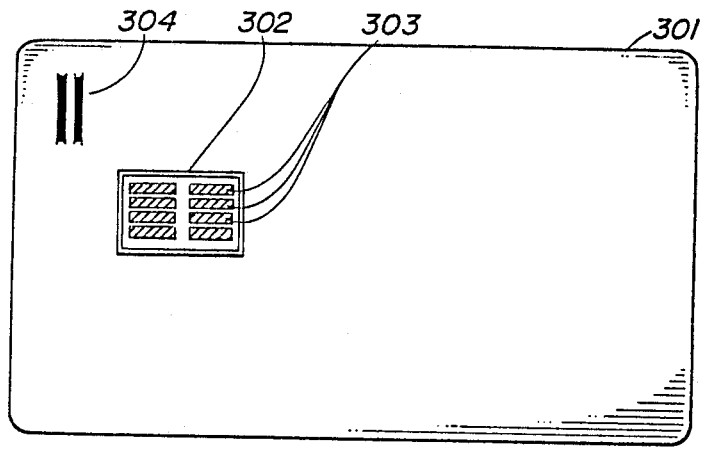
FIG. 3 is a plan view of an M-card for use in combination with an envelope.

Referring to FIG. 3, an M-card 301 is shown which does not include a key-pad or a display. It indicates, however, a galvanic contacts block 302 with individual contacts 303. It further indicates bars 304, which differ in colour from the ground and serve for the proper alignment of the card, when brought in contact with the M-card envelope.

Figure 4A:
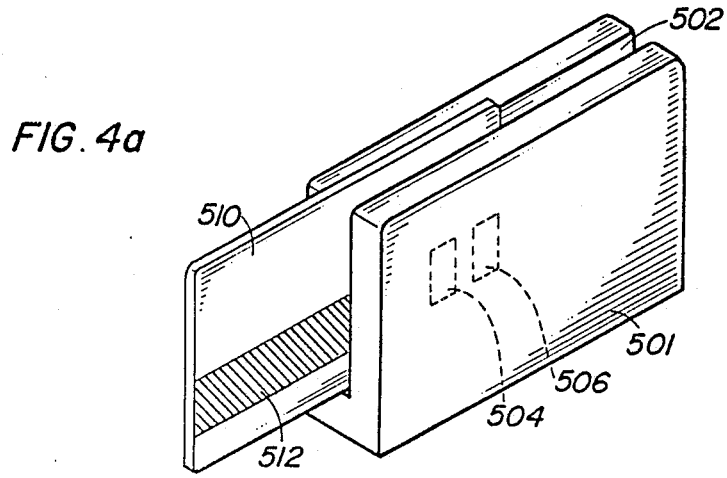
FIG. 4a is a perspective view of another embodiment of the envelope with M-card.
Figure 4:
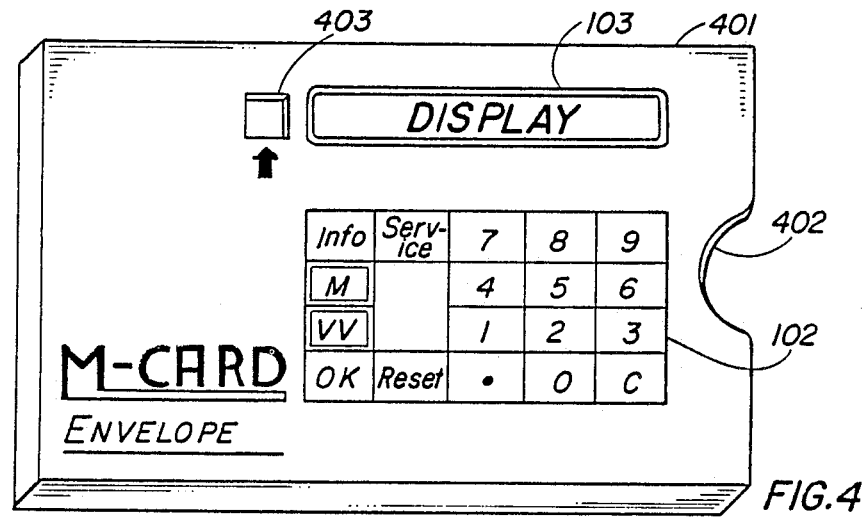
FIG. 4 is a perspective view of an envelope usable in combination with the M-card of the inventive system.
Figure 5:
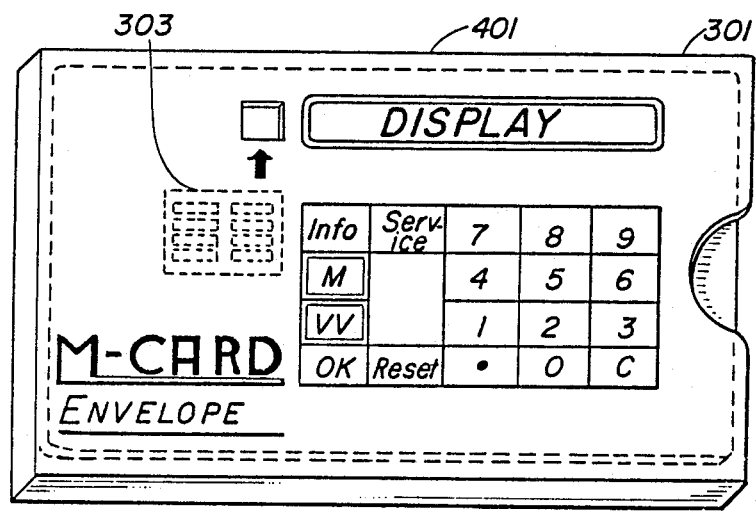
FIG. 5 is a view of the envelope with the M-card in a non-contact position.
Figure 6:
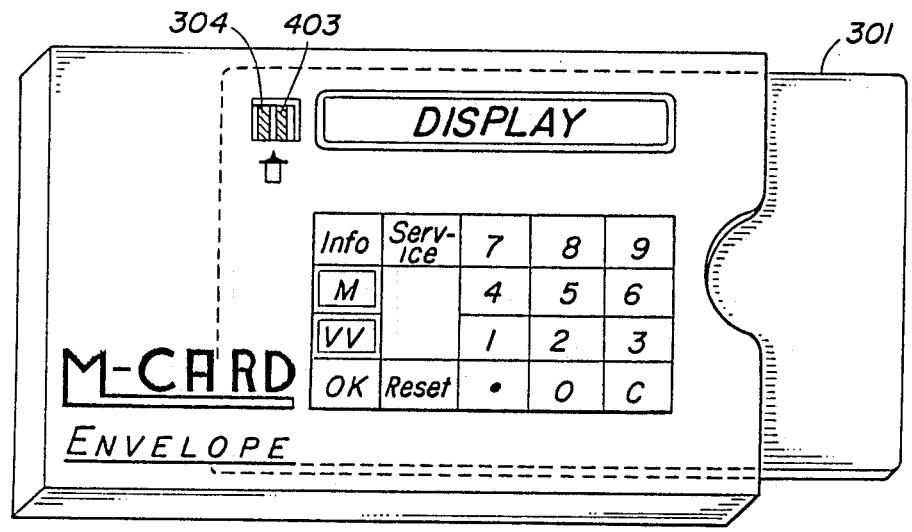
FIG. 6 is a view of the envelope with the M-card partly extracted and aligned in contacting position with envelope contacts.

FIG. 4a shows another embodiment of the invention where the envelope 501 has a slot 502 through which a programmable card 510 can be slid for programming a magnetic stripe 512 of the card. The envelope 501 may have a display, input keys and a power supply similar to the envelope of FIG. 4. In addition, envelope 501 includes a read/right head 504 for reading information from and writing information on the magnetic stripe 512, as well as an erase head 506 for erasing the magnetic stripe 512. In accordance with the present invention, the magnetic stripe 512 carries the programmable memory of the card, whether the card is a multi-user card, a variable value card, or a card issued with visitor's vouchers. The card 510 can be programmed by manually sliding the card through the slot 502.

Figure 7:
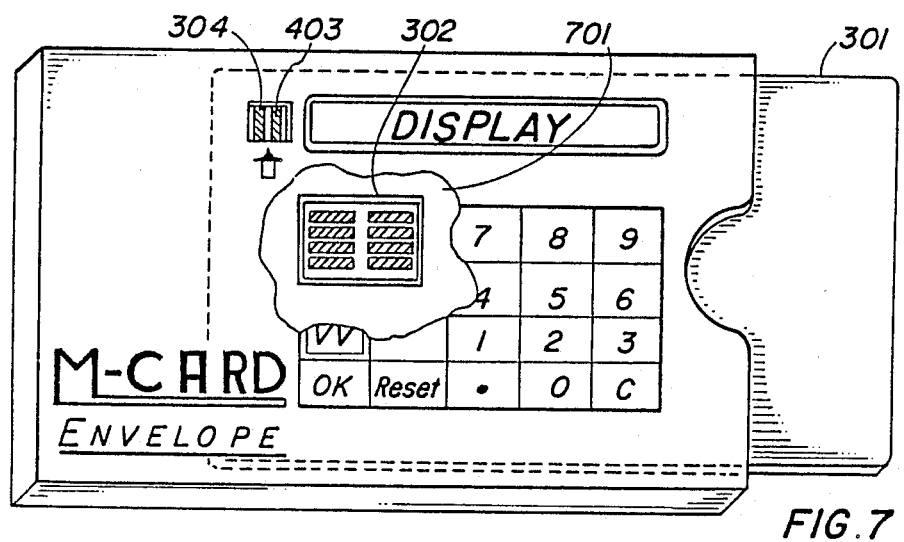
FIG. 7 is a view of the envelope with a cut-out to see contact positioning for the sub-user M-PIN and variable value operation.
Figure 8:
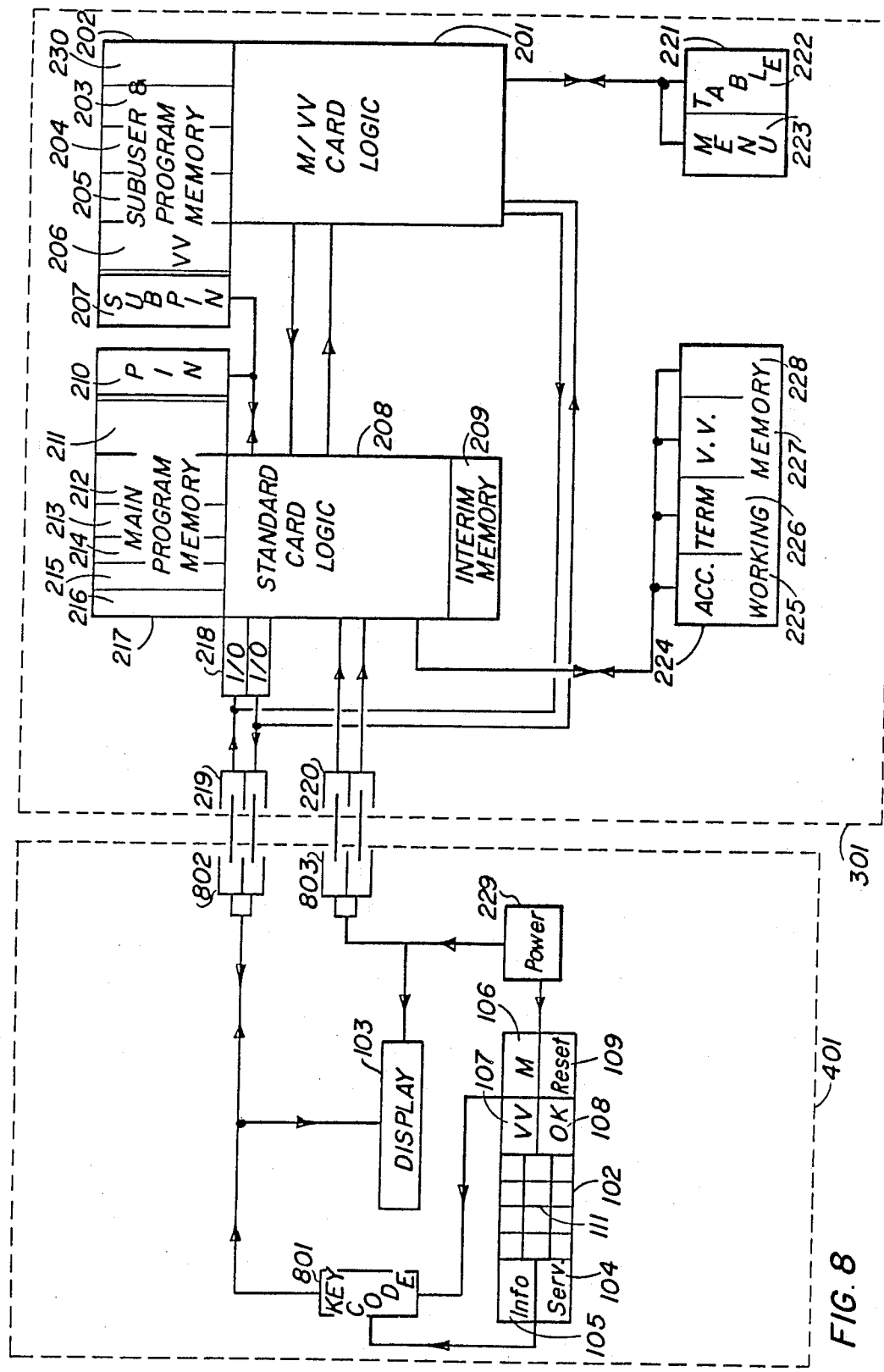
FIG. 8 is a block diagram of the M-card and the envelope, connected to each other.

FIGS. 4, 5, 6 and 7 show an M-card envelope having the keyboard 102, the display 103, a window 403 to make the alignment bars 304 visible when envelope and M-card are in the contacting position, and a recess 402 to grip the card when totally inserted in the envelope. A cut-out area 701 in FIG. 7 shows the position of terminal block 302 when alignment bars 304 on the M-card 301 are visible in the opening 403. This indicates that the terminal block 302 is in its contacting position with the counter contacts of the envelope. A snap or defective device can also be provided to hold the M-card in its proper contacting position. FIG. 8 is a block diagram of the M-card 301 when in contact with the envelope 401 Both are indicated by framing dotted lines. The parts of the card 301 are identical with the parts shown in FIG. 2 with the only difference that keyboard 102, display 103 and the power source 229 are now placed in the envelope 401. The envelope further comprises the connectors 802 and 803, which establish contact with their counterparts 219 and 220 in the card. In addition, the envelope includes key-coding means 801, which serve for the serial input of key signals into the IO device 218.

Since the function of the combination envelope, plus card, is, in principle, identical to the function of the self contained card as shown in FIG. 2, the function will be described only once in the following.

Figure 9:
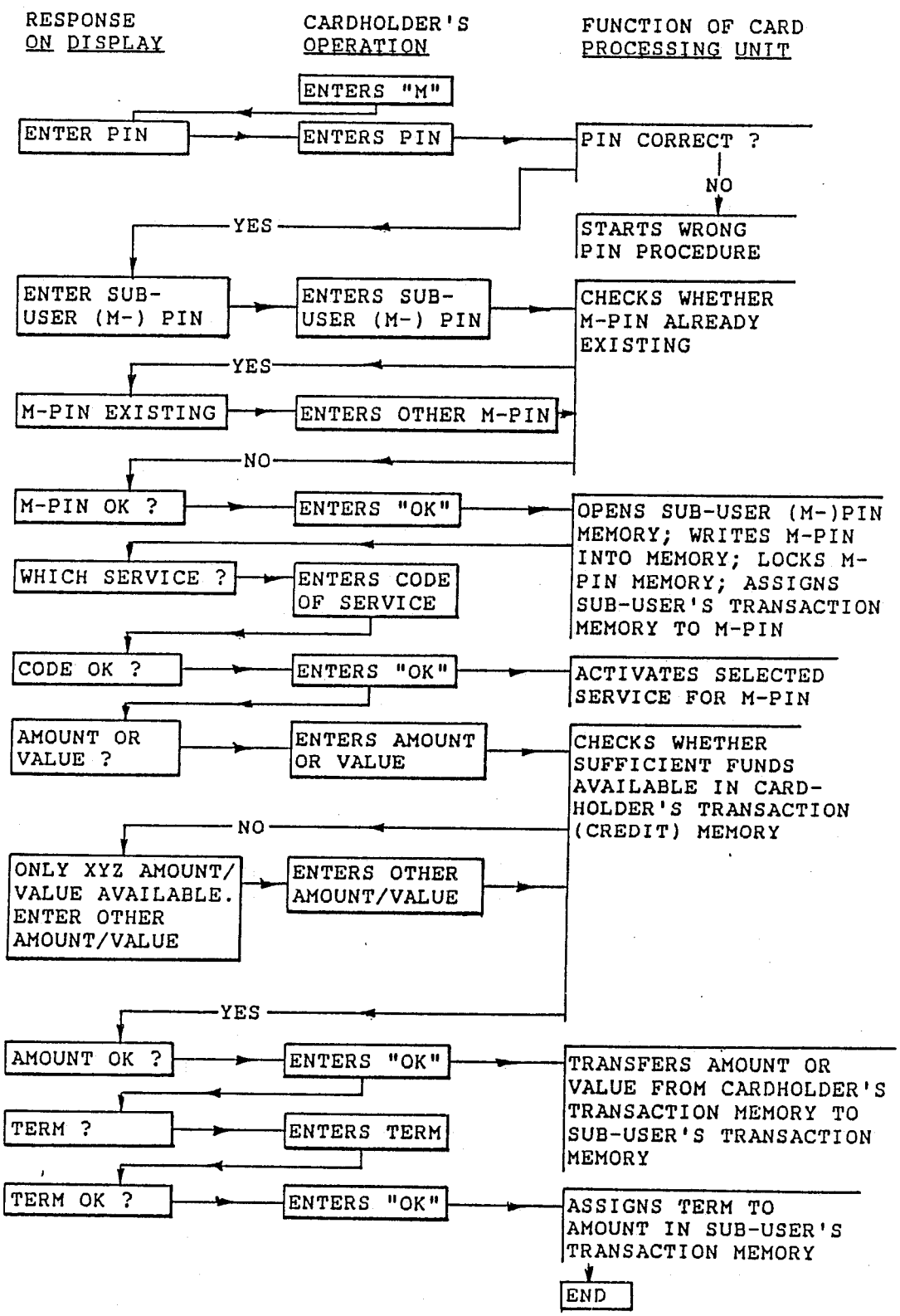
FIG. 9 is a flowchart of the multi-user programming for sub-users.

FIGS. 2 and 8 are block diagrams of a combination card comprising the means for both the sub-user and the variable value function. It will be appreciated that these two functions can also be incorporated singly in separate cards. First, the sub-user function will be described. Before starting the operation, the cardholder inserts the card into the envelope and brings it, by properly aligning the alignment bars 304 and in window 403, into its contacting position with the envelope. Then the cardholder presses the key "M" 106. The signal is coded in key-coding device 801 for serial transmission through the terminals 802 and 219 into the M/VV logic 201, which is activated by this signal Logic 201 then causes program memory 230 to release the proper instruction texts on display 103 to guide the cardholder during the operation. The following texts on display 103 are each triggered by the foregoing operational step All this is shown in the flowchart of FIG. 9.

When activated by the signal from the "M" key 106, the logic 201 further causes the standard card logic 208 to check the PIN of the cardholder in its standard way. If the PIN is correct, logic 208 releases a signal to logic 201, which then requests, via the display, the cardholder to enter the PIN of +h=sub-holder (M-PIN). To ensure that the entered PIN is the one the cardholder really wants, logic 201 activates once more, text program 230 to request the "ok" from the cardholder. The cardholder then presses the "ok" key 108, which signal coded in key coder 801 effects logic 201 to store the sub-user PIN in sub-user PIN storage 207 and make the PIN inaccessible from outside. Logic 201 triggers logic 208 to open a sub-user transaction account 225 in working memory 224.

The activation of a specific service, which is only relevant in a multi-company or multi-service card, can be used with the present invention. Details of this, however, are not included here as not being a part of the present invention. Appropriate steps, as shown in FIG. 9, can provide for this capacity.

Sub-user program 206 then causes text program 230 through display 103 to request from the cardholder, entry of the credit amount for sub-user's transaction account Upon having effected logic 208 to check in the conventional way, whether cardholder's transaction account provides insufficient funds to be transferred from cardholder's transaction account to sub-user's transaction account, the requested amount for sub-user's transaction account is then, by internal transaction program 204, through logic 201, internally transferred from cardholder's account to sub-user's transaction account 225 in working memory 224. In the case where the card is a debit card to be used for accessing the cardholder's bank account, the card will not normally have a memory for storing a cardholder transaction limit. The card, in accordance with the present invention, will, however, have a sub-user memory for storing a maximum sub-user transaction amount to which the sub-user is authorized to conduct transactions using the debit card.

In case the sub-user's authority over his/her transaction account is to be limited by a certain term (time period), the entry of such term will then be requested from cardholder by the sub-user program analogously as in the amount function Logic 201 will then cause logic 208 to enter such term into the "terms of use" memory 226 in working memory 224. Sub-user's term is then assigned to sub-user's transaction account. For the use of the M-card by a sub-user, for own transactions, the procedure is standard. The only difference is that logic 208 has—when checking the PIN—not only access to cardholder's PIN memory 210, but also to sub-user's PIN memory 207. PIN check program 211, in program memory 217, is adapted accordingly. It first checks whether the PIN inputted by the user is available in the cardholder's PIN storage, and in case it is not, it will then check with the sub-user PIN storage. If the inputted PIN cannot be found in either storage, the logic will start the wrong PIN procedure. If the inputted PIN is found in the sub-user PIN storage, the standard transaction or other program will be started by logic 208.

Figure 10:
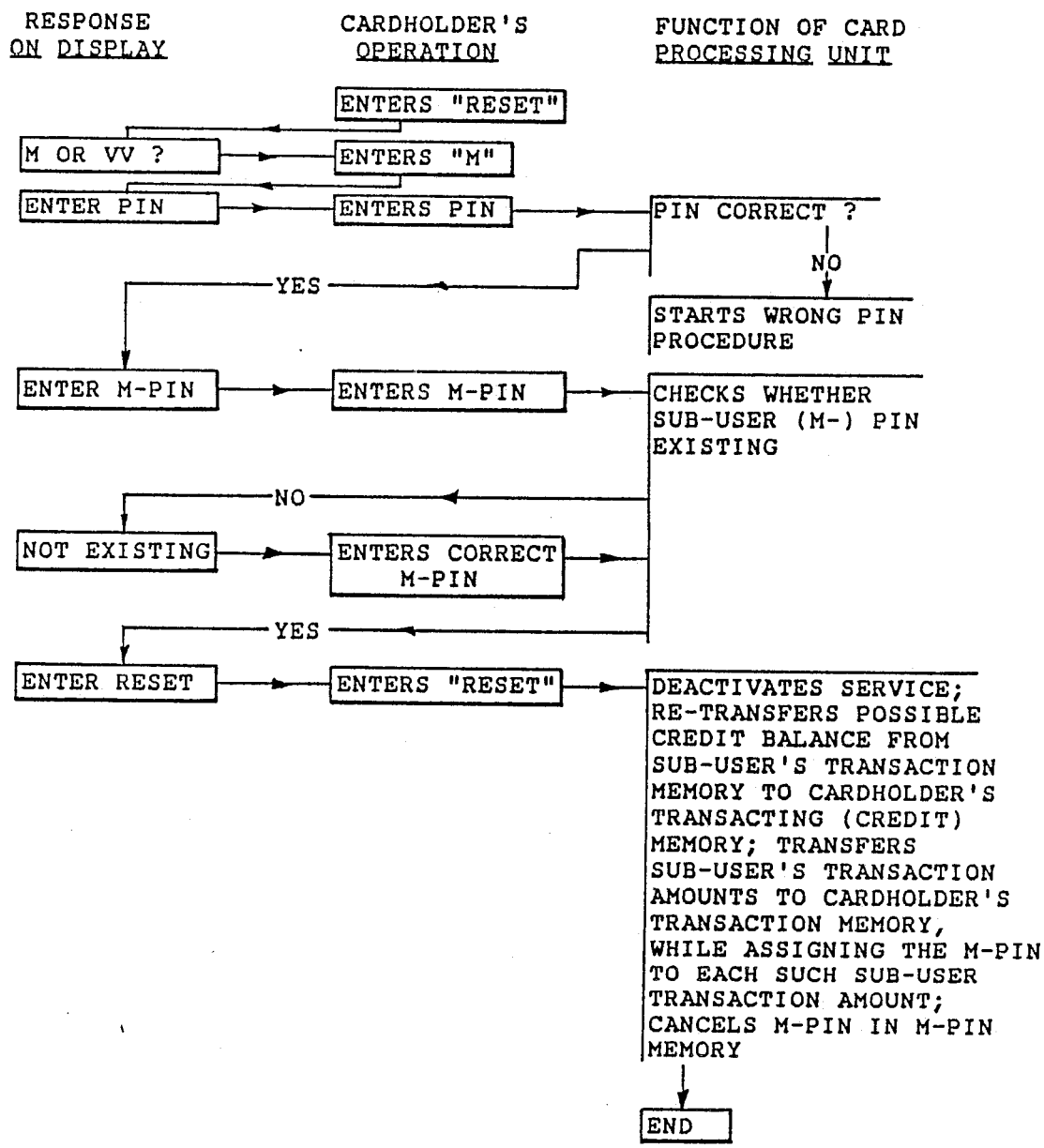
FIG. 10 is a flowchart of the cancellation process for a sub-user authorization.

FIG. 10 is a flowchart showing a process for the cancellation of sub-user authorization which is under the control of the cardholder. Sub-user program 206 in FIGS. 2 and 8, however, also causes logic 201 to automatically erase a sub-user PIN from sub-user PIN memory 207, when the sub-user's positive balance in the transaction account 225 becomes zero or the sub-user's term in memory expires, whichever occurs first.

The internal transaction program in memory 204 causes logic 201 to re-transfer through logic 208 any possible positive balance from sub-user's transaction account to cardholder's transaction account, both in transaction memory 225. It further effects the transfer of the individual transactions of sub-user from sub-user's transaction account to cardholder's transaction account, affixing sub-user's PIN to such individual transactions for later auditing. The sub-user PIN program in memory 206 then causes logic 208 through logic 201 to cancel sub-user's term in memory 226.

The sub-user uses and operates the card the same way as the cardholder does. The whole procedure within the system is, however, now related and limited to the preprogrammed credit and use data of the sub-user.

The procedure is in principle as follows:
the machine checks the card authenticity;
the card checks the sub-user's identity (upon sub-user's inputting his/her PIN);
the card accepting machine checks available funds (to sub-user) and the term (sub-user's authorization terminating date); and;
if ok for funds and term, the card accepting device executes the transaction and updates the sub-user's transaction memory within the card.

This M-card sub-user PIN procedure is thus like a "card-within-a-card".

When the credit of the sub-user has been consumed, or the term has expired, the program within the card resets the sub-user transaction memory to zero and (re-)transfers any unused balance, from the sub-user transaction memory to the cardholder's transaction (credit) memory. At the same time, the individual transactions of sub-user are transferred to the cardholder's transaction memory. To keep them identifiable for later auditing, the respective sub-user (M-)PIN is assigned, e.g., as a prefix to the amount(s) of the sub-user transaction(s).

Simultaneously, with the closing of the sub-user's transaction account (memory), the sub-user PIN will also be cancelled (automatic card function).

Such terminating functions are executed either at the end of the last transaction, which consumates the whole credit or the rest of it; in case of expiration by time, when the card is used the next time with a card accepting device, which contains a calendar (real time clock), or receives the date from a host computer.

Where the "envelope" comprises a calendar, the cancellation will be effected when a card is inserted the next time after the expiration date, into the envelope.

Figure 11:
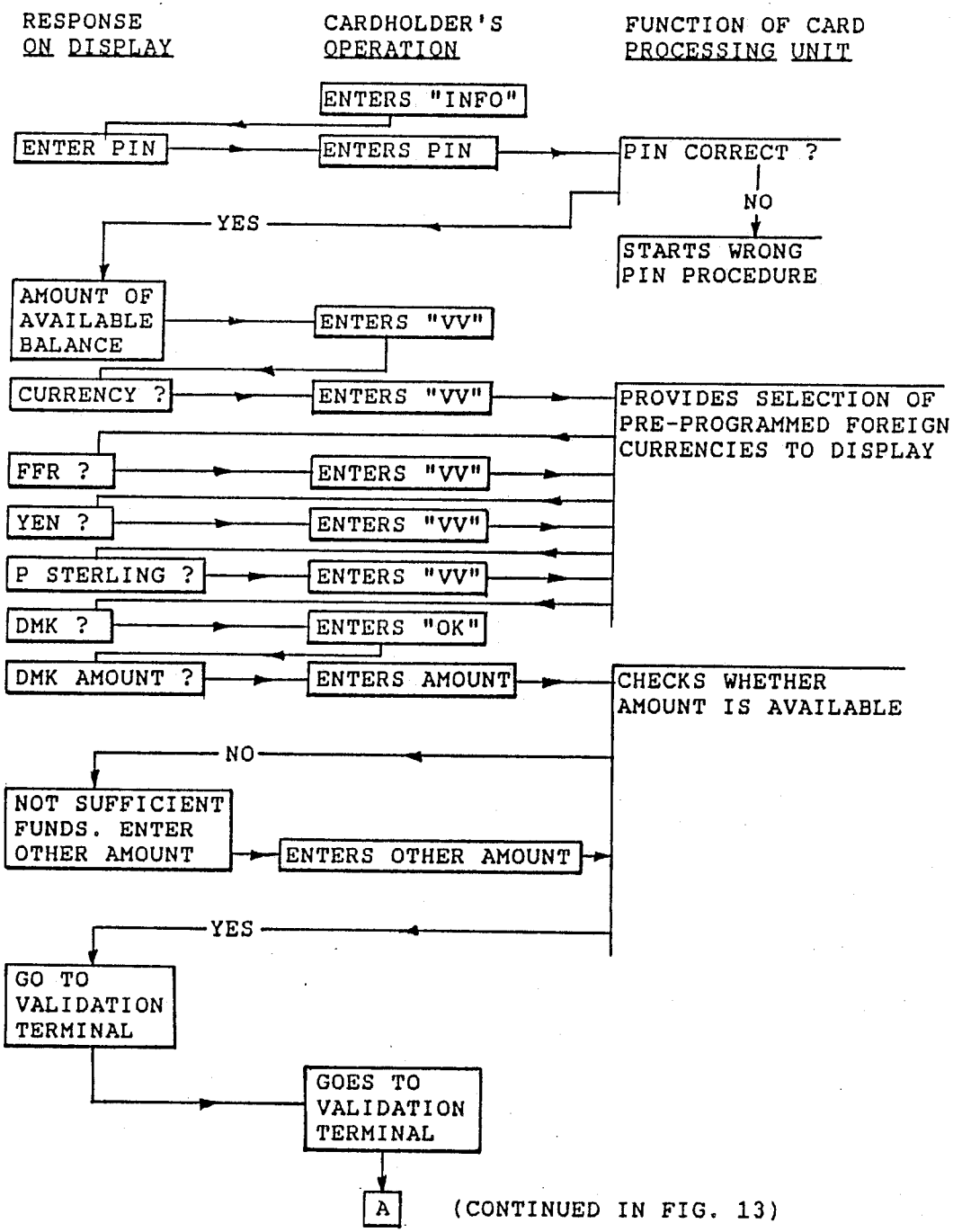
FIG. 11 is a flowchart of the variable value programming demonstrated with the example "FOREIGN EXCHANGE", including information on credit status.
Figure 12:
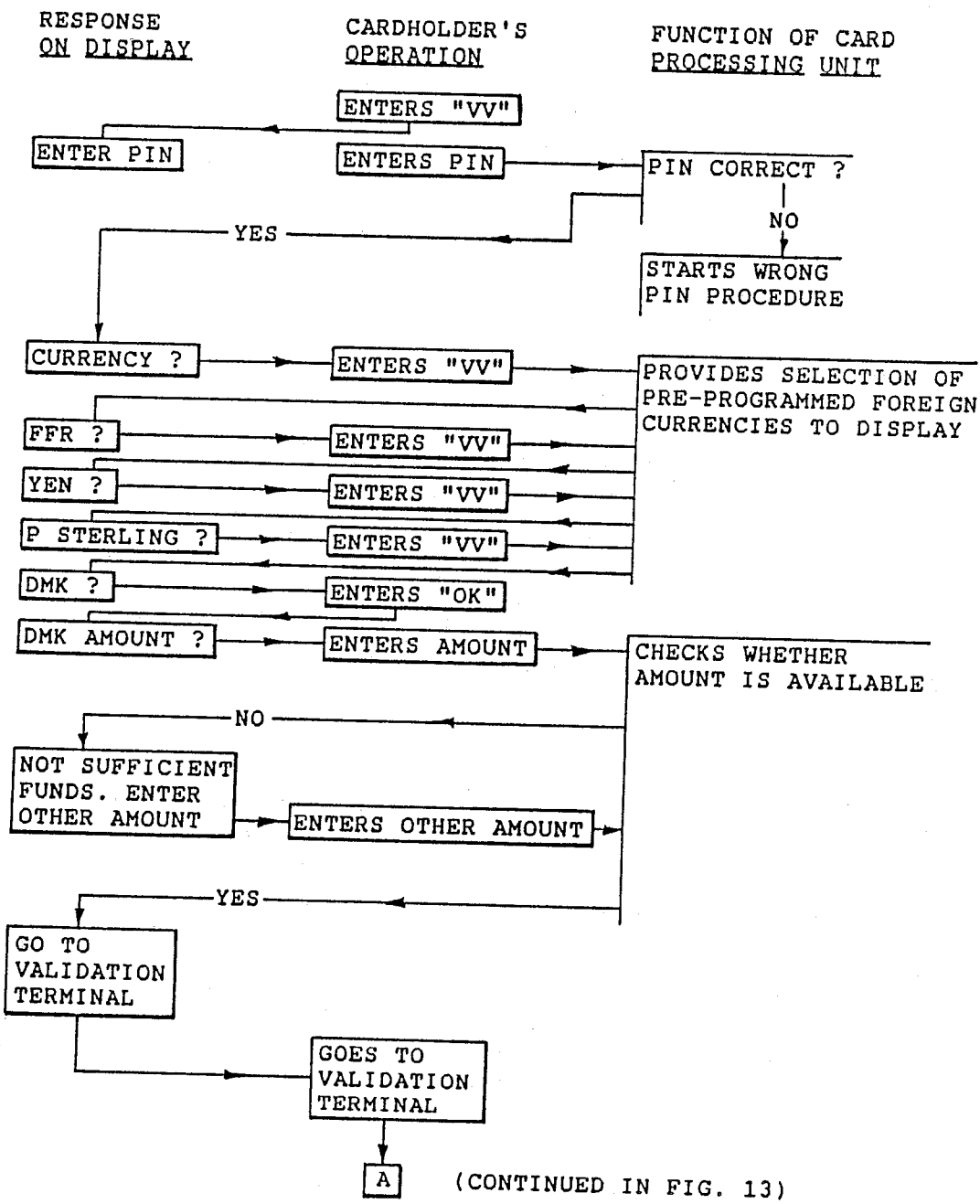
FIG. 12 is a flowchart of variable value programming shown in FIG. 11 without information on status.

FIGS. 11 and 12 are flowcharts, which demonstrate variable value programming ("VV" key). FIG. 11 shows the alternative, when the cardholder can inform him/herself via the info program in memory 216, on the available amount of credit for such operation. FIG. 12 shows the flowchart without the "info" function.

The variable value related section of the text program in memory 230 can be programmed in various ways. The function will be explained by the example "foreign exchange". A cardholder or sub-user disposes in his transaction account in memory 225, a certain credit balance in a given original currency. At a certain time, he/she wants to dispose of foreign exchange. Since both the cardholder and the sub-user can make use of this function, they will be referred to as "user" in the following for the purpose of describing this particular function.

To start the function, the user presses the "VV" key 107 The key signal effects the variable value program in memory 205 to request the user to prove his/her authorization by entering his/her PIN. So far, the procedure is the same as with the sub-user function as explained before Once the entered PIN has been identified as correct, the variable value program causes logic 201 to call up the foreign exchange designation menu in memory 221. For this application, a selection of the designations of foreign currencies is preprogrammed in this memory. The user can now repeatedly press the "VV" key 107, which causes logic 201 under the variable value program in memory 205 to display after each keystroke, the next designation of a foreign currency in a pre-arranged order.

When the desired currency appears on the display, the user presses the "ok" key, whose signal then causes the variable value program to ask the user, via the display, for the amount. The user then enters the amount onto numeric key-pad 111. Hereafter, as explained above, under the function "sub-user programming", the program checks whether the entered amount is available as a credit balance in the cardholder's or sub-user's transaction account memory 225. If sufficient funds are available, the internal transaction program in memory 204 transfers the selected amount from cardholder's or sub-user's transaction memory 225 to interim memory 212. Then, the variable value program in memory 205 effects the arithmetic calculation program in memory 213 to convert the amount of original currency by calculating, with the proper conversion factor in memory 222, the amount of selected foreign currency The resulting amount of foreign currency is then transferred to VV (variable value) transaction memory 227. The variable value program in memory 205 effects through logic 201 the assigning of the designation of the foreign currency to this amount which is stored in VV memory 227.

The above function is related to the exchange of currencies which is based on fixed rates of exchange Such fixed rates of exchange are in the foregoing referred to as conversion or variation factors.

When there is a floating rate of exchange between an original currency and a foreign currency, the procedure is split in one group of M-card functions, including selecting the designation of foreign currency to be exchanged and transferring the desired amount from M-card transaction memory 225 to interim memory 212, and another of the external machine functions, comprising calculating the amount of foreign currency based on the then prevailing (floating) rate of exchange, and causing the variable value program in memory 205 within the M-card to store the calculated amount of foreign currency in variable value transaction memory 227, while cancelling the amount of original currency in interim memory 212 at the same time. By machine program, the designation of the foreign currency and the rate of exchange used to calculate the amount of foreign currency, are assigned to the transferred amount of foreign currency now stored in variable value memory for the purpose of later re-exchange of foreign currency that was not used up into the original currency. That is, the designation is affixed to the amount stored in the variable value memory permit any transactions involving the memory to be conducted according to the designated currency. This further is a fair way of re-exchange, as neither the issuing organization nor the cardholder suffers a financial disadvantage in case the rate has changed between the time of exchange and the time of re-exchange, which is fundamentally different from the present procedure, where a person (or an organization, such as a business company) has to accept the loss when the rate of exchange has floated in an unfavourable direction.

Figure 13:
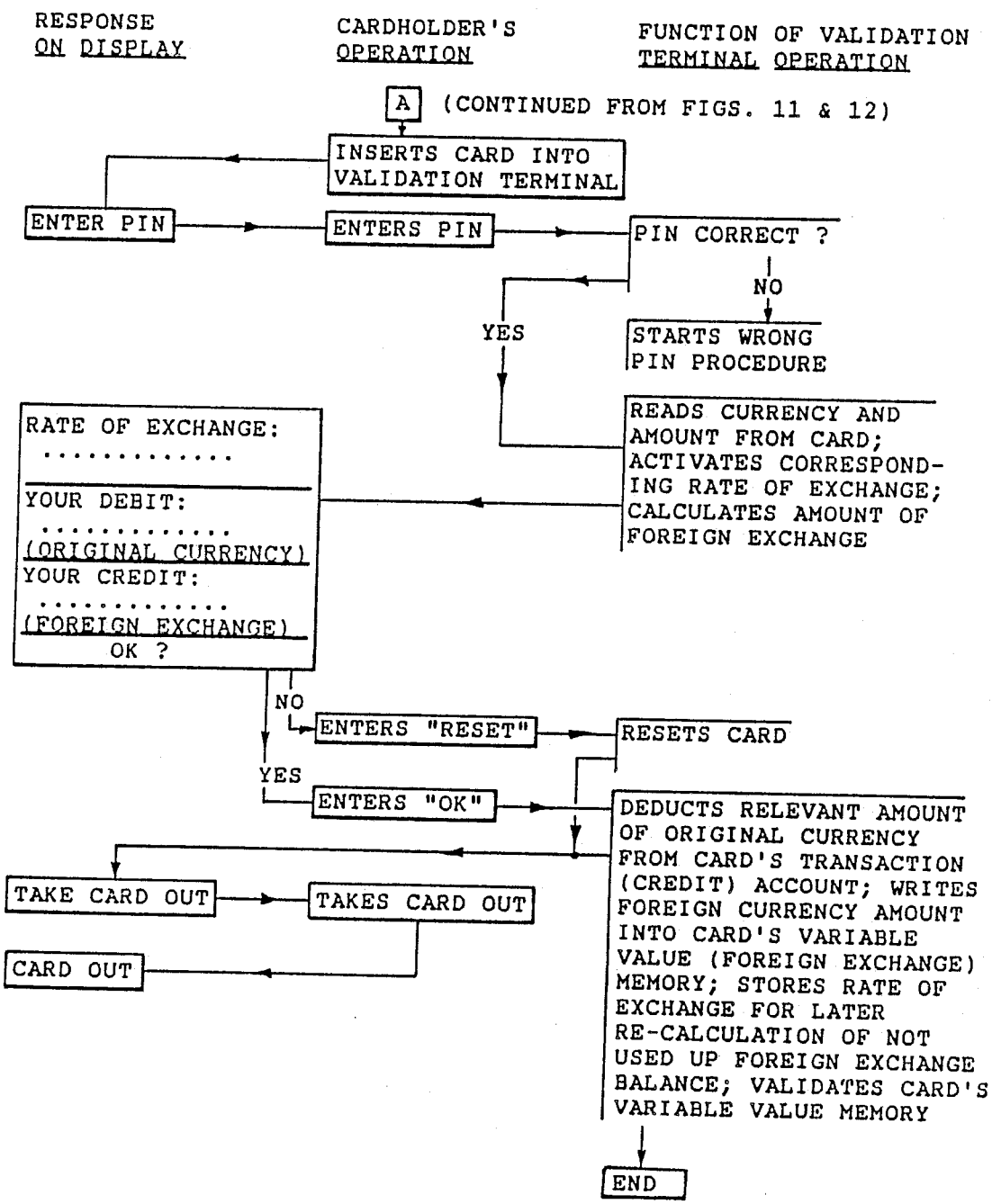
FIG. 13 is a flowchart of the terminal validating process related to FIGS. 11 and 12.
Figure 14:
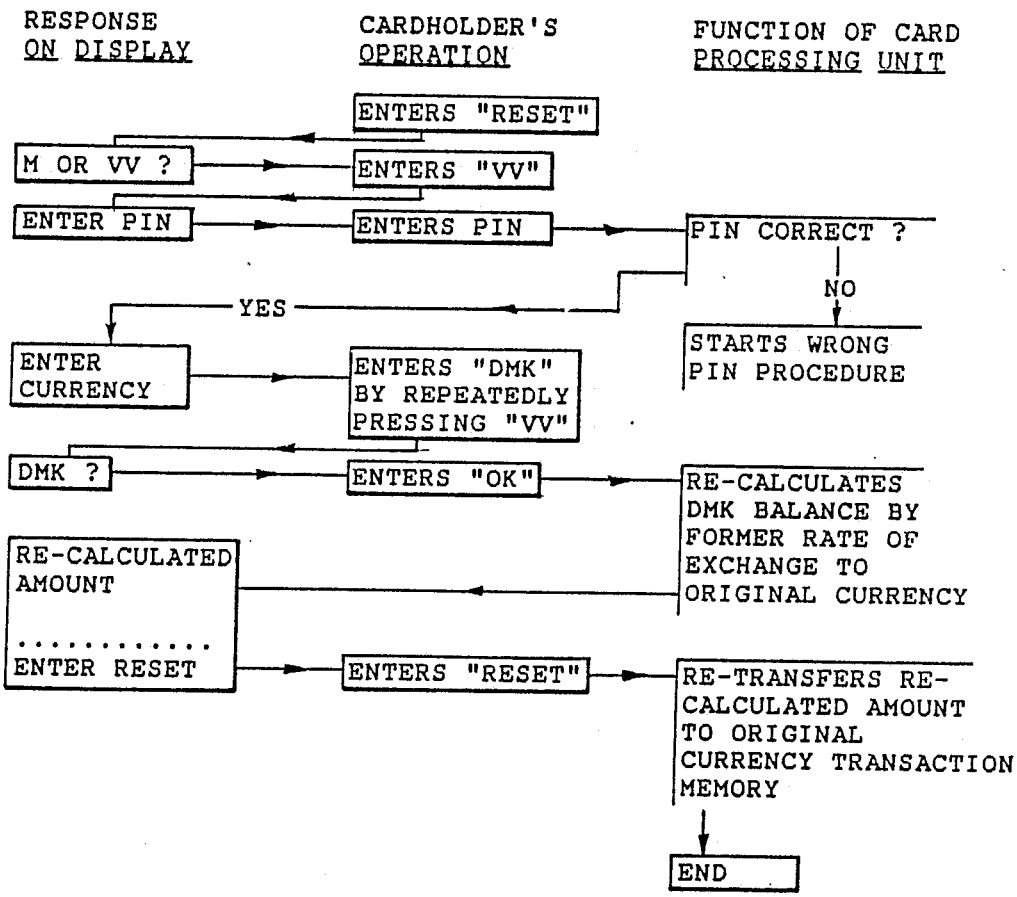
FIG. 14 is a flowchart of the re-change process.

FIGS. 11, 12 and 13 show flowcharts which elucidate the procedure when the exchange is determined by a floating rate of exchange. FIG. 14 is a flowchart which illustrates the procedure of re-exchange.

Figure 15:
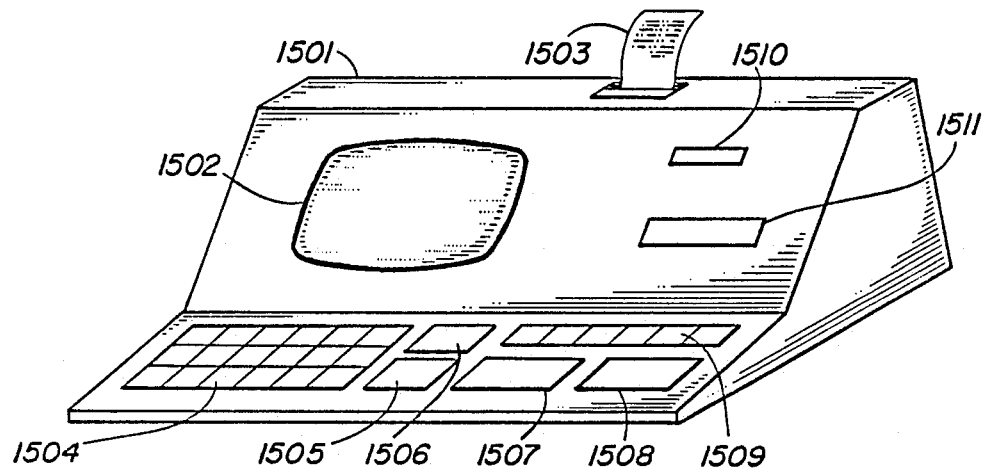
FIG. 15 is a perspective view of the visitor voucher card issuing machine, showing the operator control panel.
Figure 16:
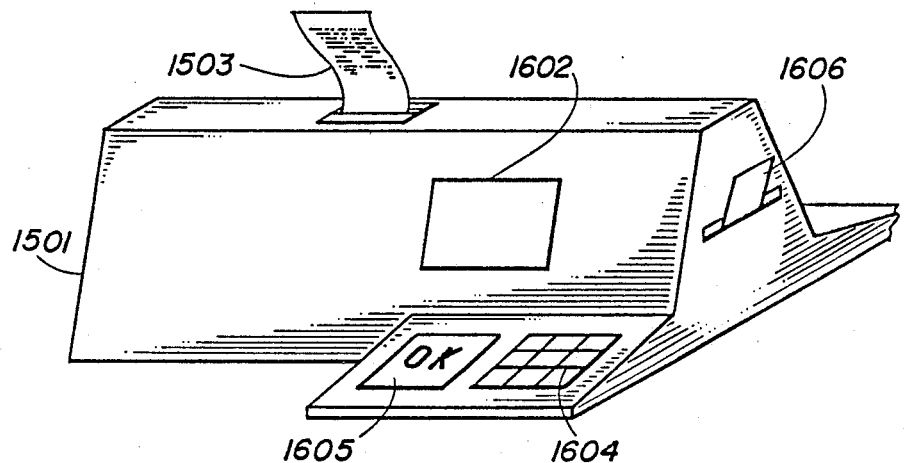
FIG. 16 is a view of the machine of FIG.!5, showing the visitor control panel.

FIGS. 15 and 16 are views of an issuing machine 1501 for the M-card in its application of visitor vouchers (ViVo) In this embodiment, the issuing machine is designed in a way that the teller (bank or government operator) and the visitor are sitting in front of each other. FIG. 15 shows the operator's and FIG. 16 the visitor's control panels In FIG. 15, the machine comprises an operator's display 1502, alpha-numerical keyboard 1504, a "start" button 1506, an "ok" button 1505, a PIN-pad 1507, a currency selector keyboard 1509, a customer slip printer 1503, a visitor's home credit/debit card slot 1510 and a foreign banknote acceptor 1511. The visitor's home credit/debit card insertion slot could also be placed on the visitor's side. 1508 is a reset key.

In FIG. 16, the machine further comprises a visitor's display 1602, a PIN-pad 1604, an "ok" button 1605 and an (M-)ViVo card stacker and dispenser 1606.

Figure 17:
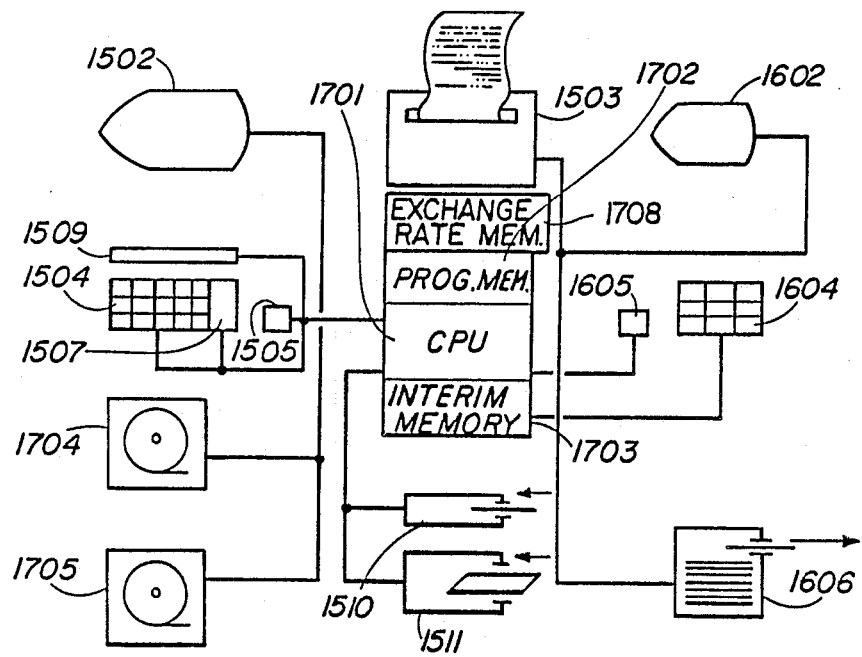
FIG. 17 is a block diagram of the visitor voucher card issuing machine.

FIG. 17 is block diagram of the (ViVo) card issuing machine. Besides the elements that are visible from the outside, the machine comprises a processing unit 1701, program memory 1702, interim PIN memory 1703 (which is disposable where there is no stored PIN record), a general visitor file 1704 and a machine journal and audit file 1705. 1708 is an exchange rate storage.

Figure 18:
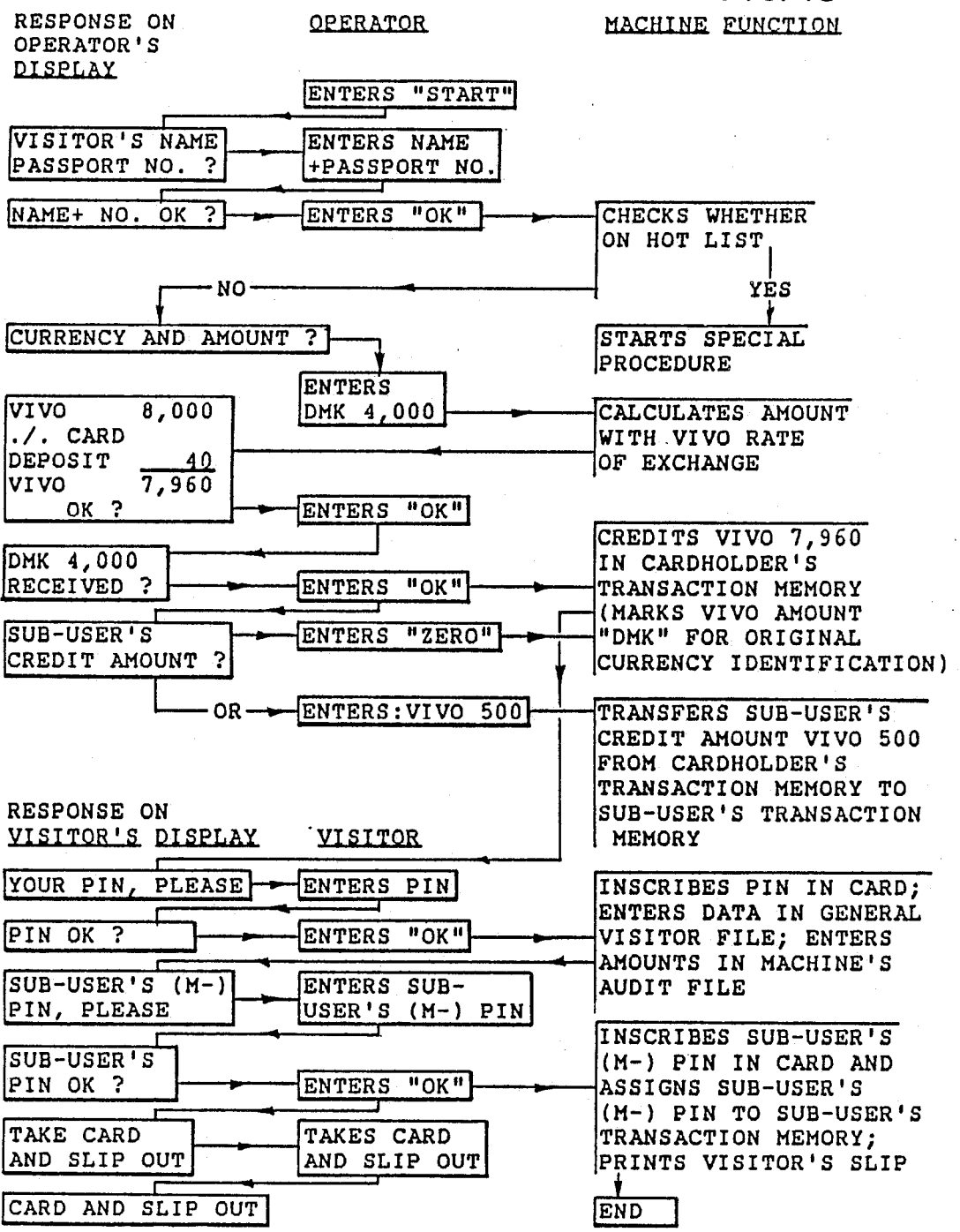
FIG. 18 is a flowchart of the visitor voucher card issuing process; the process related to FIG. 17.

Operations by both the operator and the visitor and the machine function are shown in the flowchart of FIG. 18.

Figure 19:
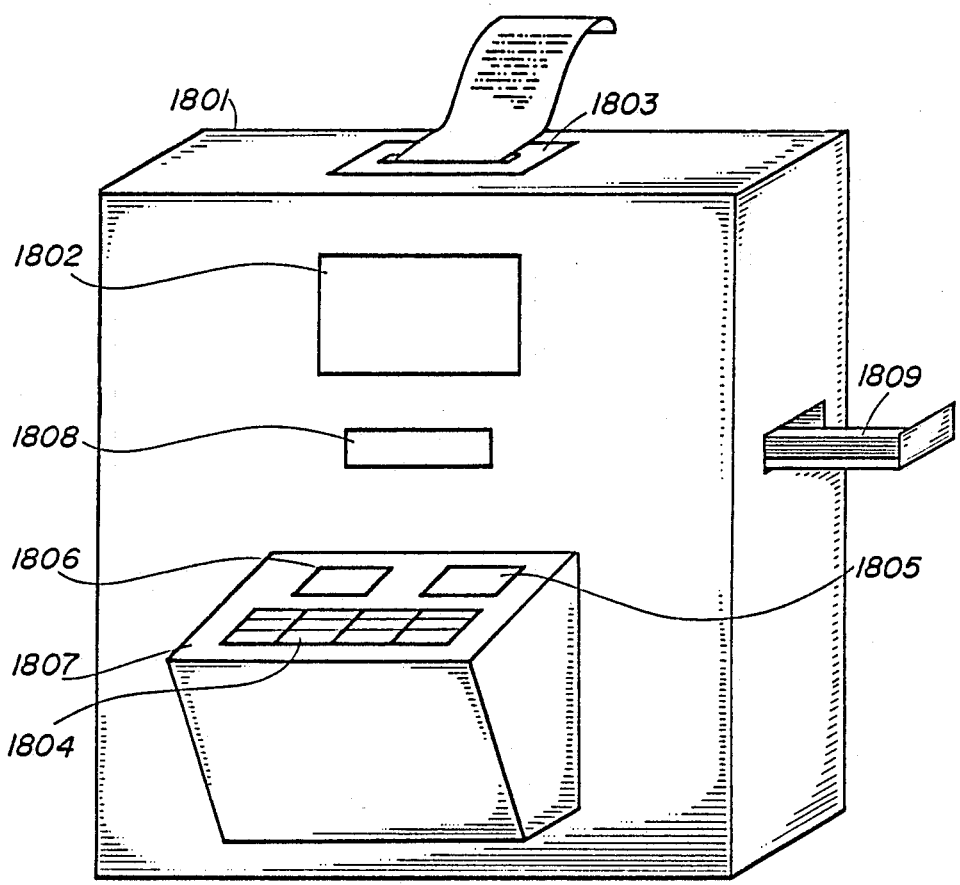
FIG. 19 is a perspective view of a visitor voucher card return machine.

FIG. 19 is a perspective view of a (M-)ViVo card return machine 1801, which accepts at the place of the visitor's departure, the return ViVo card. The machine comprises visitor's display 1802 and, arranged in the visitor's control panel 1807, the "start" button 1806, the "ok" button 1805, the card return slot 1808, the PIN-pad 1804, the visitor's slip printer 1803 and the bank note dispenser 1809.

Figure 20:
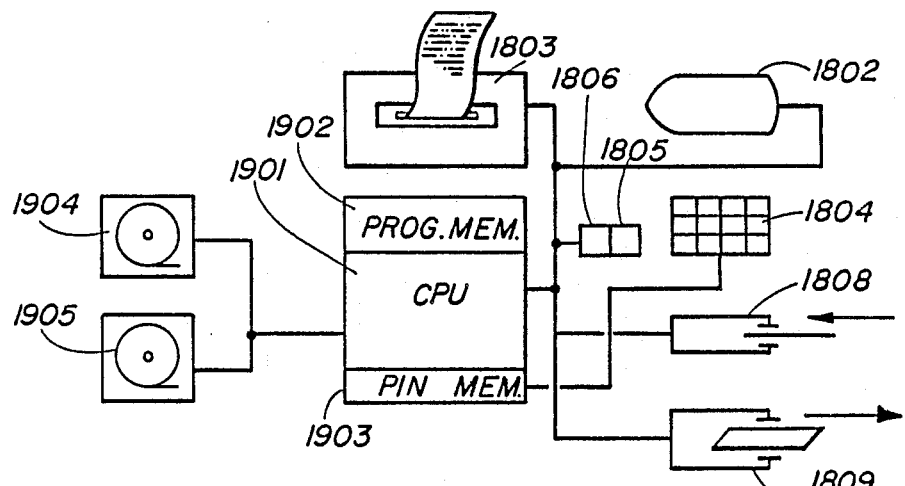
FIG. 20 is a block diagram of a visitor voucher card return machine.

FIG. 20 is a block diagram of the machine of FIG. 19, including a processing unit 1901, a program memory 1902, an interim PIN memory 1903, the general visitor file 1904, and the machine's journal and audit file 1905.

Figure 21:
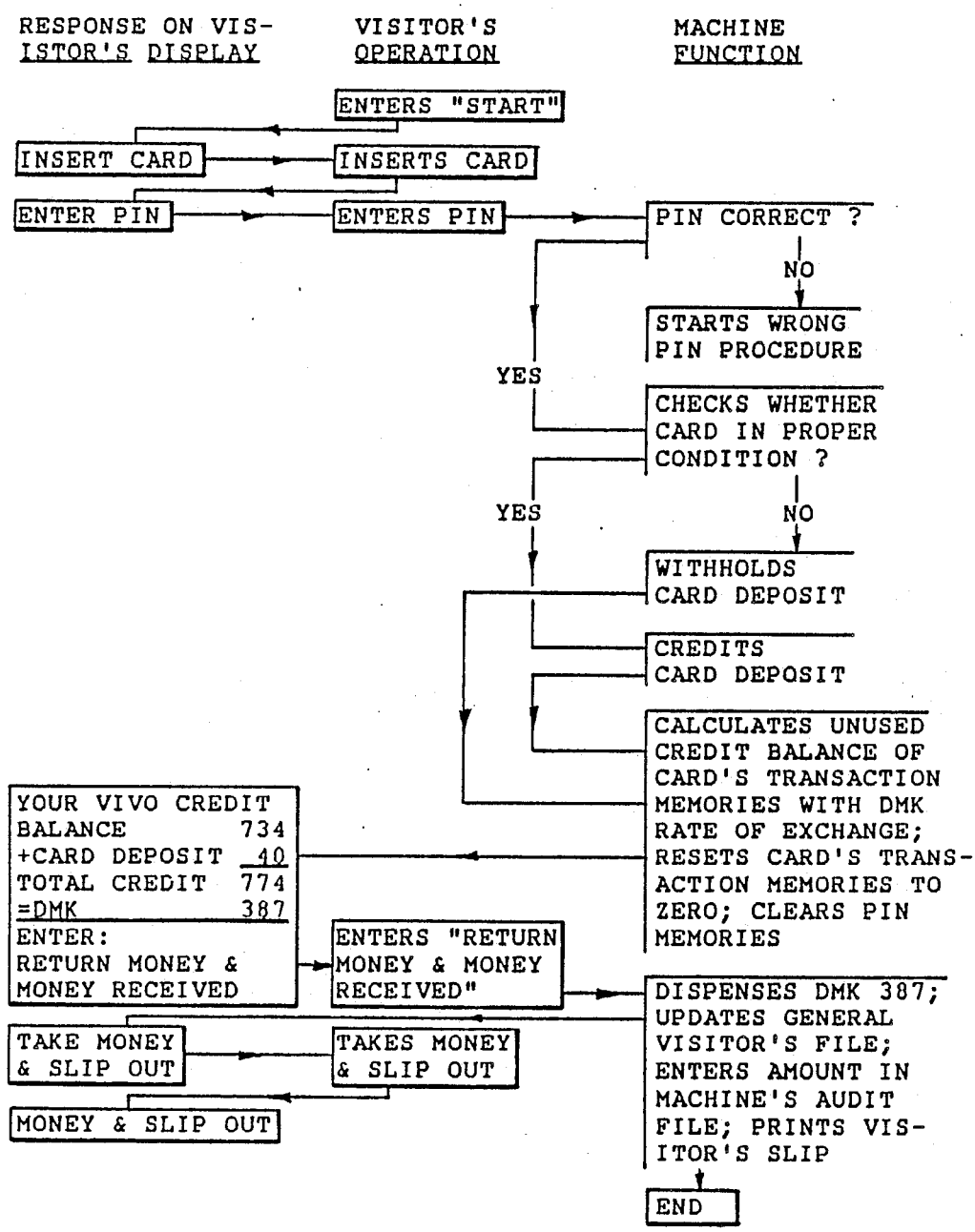
FIG. 21 is a flowchart of the visitor voucher card return process, related to FIGS. 19 and 20.

FIG. 21 shows a flowchart which explains the ViVo card return operation and card return machine function.

What is claimed is:

1. An apparatus and transaction card combination comprising:

a currency value memory for storing exchange rates of a plurality of currencies as compared to a number of visitor's vouchers that are issuable by said apparatus;

means for receiving and for detecting the value of any one of said currencies;

storing means connected to said currency value memory means for calculating a selected number of visitor's vouchers which corresponds to a value of the currency received, and for storing the selected number as a transaction value limit in a transaction card;

code selection means for selecting a unique cardholder personal enabling code, said storing means operating to store said selected cardholder personal enabling code in said transaction card;

card dispensing means for dispensing said transaction card after the transaction value limit and the cardholder personal enabling code have been stored therein; and said transaction card dispensable by said card dispensing means comprising a programmable cardholder memory means for storing the cardholder personal enabling code;

authenticity checking means for authenticating a personal enabling code as corresponding to the stored cardholder personal enabling code for permitting a cardholder to conduct activities with said transaction card; and a programmable cardholder memory for storing the selected number of visitor's vouchers corresponding to the transacting value limit in said transaction card.

2. An apparatus and transaction card combination comprising:
   a currency value memory for storing exchange rates of a plurality of currencies as compared to a number of visitor's vouchers that are issuable by said apparatus;
   means for receiving and for detecting the value of any one of said currencies;
   storing means connected to said currency value memory means for calculating a selected number of visitor's vouchers which corresponds to a value of the currency received, and for storing the selected number as a transaction value limit in a transaction card;
   card dispensing means for dispensing the card after the transaction value limit has been stored therein;
   a transaction card return device comprising transaction card receiving means for receiving and reading said transaction card;
   program means connected to said card receiving means for calculating an unused balance of the transaction value limit stored in said transaction card; and
   value returning means connected to said program means for returning a value of currency corresponding to the remaining transaction value limit.

3. An apparatus according to claim 2 including authenticity checking means connected to said program means for receiving a cardholder personal enabling code and for comparing the personal enabling code to a stored personal enabling code in said transaction card, for activating one of said program means and said value returning means.

4. An apparatus and transaction card combination comprising:
   a currency value memory for storing exchange rates of a plurality of currencies as compared to a number of visitor's vouchers that are issuable by said apparatus;
   means for receiving and for detecting the value of any one of said currencies;
   storing means connected to said currency value memory means for calculating a selected number of visitor's vouchers which corresponds to a value of the currency received, and for storing the selected number as a transaction value limit in a transaction card;
   card dispensing means for dispensing the card after the transaction value limit and a cardholder personal enabling code have been stored therein; and
   a transaction card which comprises cardholder memory means for storing a cardholder personal enabling code; programmable sub-user memory means for storing a sub-user personal enabling code; program means for programming said programmable sub-user memory means with at least one selected sub-user personal enabling code; and authenticity checking means for authenticating a personal enabling code as corresponding to the stored cardholder personal enabling code and permitting access to said program means for programming said sub-user memory means, said authenticity checking means also authenticating a personal enabling code as corresponding to a sub-user personal enabling code stored in said sub-user memory means.

5. An apparatus for issuing a transaction card comprising:
   a currency value memory for storing exchange rates of a plurality of currencies as compared to a number of visitor's vouchers that are issuable by said apparatus;
   storing means connected to said currency value memory means for calculating a selected number of visitor's vouchers which corresponds to a value of currency received, and for storing the selected number as a transaction value limit in a transaction card;
   card dispensing means for dispensing the card after the transaction value limit has been stored therein; and
   value receiving and detecting means connected to said storing means for receiving a value of currency in any one of the plurality of currencies, said value receiving and detecting means comprises a card reader for reading the value of currency from a visitor's card, and a note receiver for receiving and reading the value of currency in currency notes.

6. An apparatus according to claim 5 including a keypad connecting to said value receiving means for inputting the value of currency to be received by said value receiving means, and a currency selection keypad connected to said currency value memory for selecting the currency from among the plurality of currencies in the currency value memory.

7. An apparatus for an operator to issue a transaction card to a cardholder comprising:
   a currency value memory for storing exchange rates of a plurality of currencies as compared to a number of visitor's vouchers that are issuable by said apparatus;
   means for receiving from a customer and for detecting the value of any one of said currencies;
   storing means connected to said currency value memory means for calculating a selected number of visitor's vouchers which corresponds to a value of the currency received from the cardholder, and for storing the selected number as a transaction value limit in a transaction card;
   code selection means positioned to be accessible by the cardholder for selecting a unique cardholder personal enabling code, said selection means not being accessible to the operator, said storing means operating to store said selected cardholder personal enabling code in said transaction card; and
   card dispensing means for dispensing the card to the cardholder after the transaction value limit and code have been stored therein.

8. An apparatus according to claim 7 wherein said code selection means comprises a keypad which is positioned to be accessible by the cardholder and to be inaccessible by the operator when operating the apparatus.

9. An apparatus according to claim 8 including a second keypad and display which is positioned to be accessible by the operator when operating the apparatus, and to be inaccessible by the cardholder.

* * * * *